United States Patent
Celikkaya et al.

(10) Patent No.: US 7,232,543 B2
(45) Date of Patent: Jun. 19, 2007

(54) POWER FEEDING METHOD AND APPARATUS

(75) Inventors: Ahmet Celikkaya, Woodbury, MN (US); Thomas J. Anderson, Woodbury, MN (US); Frederick A. Magadanz, Scandia, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 537 days.

(21) Appl. No.: 10/739,233

(22) Filed: Dec. 18, 2003

(65) Prior Publication Data

US 2005/0133974 A1    Jun. 23, 2005

(51) Int. Cl.
*C21C 7/00* (2006.01)

(52) U.S. Cl. ..................... 266/216; 222/189

(58) Field of Classification Search ................ 266/216; 222/189

See application file for complete search history.

(56) References Cited

U.S. PATENT DOCUMENTS

| | | | |
|---|---|---|---|
| 3,841,530 A * | 10/1974 | Janninck | 222/189.04 |
| 4,271,011 A | 6/1981 | Spencer et al. | |
| 5,178,335 A | 1/1993 | Mertens | |
| 5,839,674 A | 11/1998 | Ellis | |
| 6,513,739 B2 | 2/2003 | Fritz et al. | |
| 2003/0081314 A1 | 5/2003 | Destain | |
| 2003/0145525 A1 | 8/2003 | Rosenflanz | |
| 2005/0132655 A1 | 6/2005 | Anderson et al. | |
| 2005/0132657 A1 | 6/2005 | Celikkaya et al. | |
| 2005/0132658 A1 | 6/2005 | Celikkaya et al. | |
| 2005/0137076 A1 | 6/2005 | Rosenflanz et al. | |
| 2005/0137077 A1 | 6/2005 | Bange et al. | |
| 2005/0137078 A1 | 6/2005 | Anderson et al. | |

OTHER PUBLICATIONS

Standard: "Standard Specification for Wire Cloth and Sieves for Testing Purposes[1] ," ASTM International, Designation: E 11-01, (date unknown but prior to filing date of instant application), pp. 1-5.

Standard: "Nominal Dimensions, Permissible Variations for Wire Cloth of Standard test Sieves (U.S.A.) Standard Series," ASTM International, Designation: E-11, (date unknown but prior to filing date of instant application), pp. 3-6.

Standard: "Standard Specification for Industrial Woven Wire Cloth[1] ,"ASTM International, Designation: E 2016-99, (date unknown but prior to filing date of instant application), pp. 1-30.

* cited by examiner

*Primary Examiner*—Scott Kastler
(74) *Attorney, Agent, or Firm*—Rick L. Franzen (57) ABSTRACT

A powder feeding assembly for feeding a flame-melting device is disclosed. The powder feeding assembly includes a powder holding chamber with a screening member and a brush assembly disposed therein. The brush assembly includes at least one bristle element having a distal and a proximal end. The distal end is disposed proximate to the screening member. Powder held in the powder holding chamber is urged through one or more openings in the screening member by rotating the brush assembly. The powder is then delivered to an input section of the flame-melting device for processing.

22 Claims, 6 Drawing Sheets

POWER FEEDING METHOD AND APPARATUS

FIELD

This invention relates to an apparatus and method for powder feeding, and more particularly, to an apparatus and method for feeding powder to a flame-melting device.

BACKGROUND

Flame-melting is a process whereby powders are fed into a device that uses high temperature to transform the particles into crystalline and/or amorphous materials. Powders are fed into the flame-melting device by powder feeders such as vibratory, screw, twin-screw, drum, and gas suspension feeders. These feeders can be used to deliver powder feed stock to the flame-melting apparatus at a controlled rate. Feed rate is typically controlled volumetrically or by a mass loss. In the feeder types currently used, when feeding fine powders that have less than ideal flow properties, difficulties are encountered. First, transporting the powder in a continuous, stable manner without bridging (as described in the following paragraph) is a concern. Second, supplying the powders within a given size or particulate range without significant agglomeration is also a concern.

In many instances, when feeding powders (i.e., powders that lack free-flow properties) through a feeder, such as a screw or a vibratory feeder, the powders may pack to a high density and form a packed bed that further limits the transport of powders. Such packing typically results in a situation where the powder is removed from the powder bed where the screw makes physical contact with the powder bed, but the remainder of the powder remains packed. This packing forms a structure that inhibits flow (i.e., "bridging" occurs). When bridging occurs, either the powder transport ceases, or it becomes intermittent (when pieces of this dense pack break, there is powder transport). This is a highly undesirable situation.

Several of the feeders known today address the first problem by using a combination of various powder transport techniques. For example, a screw-type feeder may be placed on a vibrating platform or include a mechanical mixer within the powder feed container. However, there is still further a need to improve the problem of agglomeration of the powder being fed. Further, for example, although gas atomization aids in reducing agglomeration, the gas flow that accompanies the powder is not always desirable, as the carrier gas flow may interfere with the rest of the process. Furthermore, for example, gas suspension feeders are not typically capable of feeding powders at high rates desired for some processes.

Vibratory feeders tend to have the powders agglomerate into larger than desired sizes, and the feed rate pulsates. Disadvantages of vibratory feeders include, powders agglomerating into undesirable larger sizes, as well as undesirable variable feed rates.

One undesirable characteristic of gas suspension powder delivery systems is that the use of excess carrier gas, an undesired byproduct of the powder feed, tends to cool the flame temperature. This is because a relatively high pressure of gas (i.e., a relatively high carrier gas flow rate) is needed to suspend and carry the powder particles. The result is a relatively low powder concentration in the gas. In addition, there is a practical limit on the amount of powder that can be suspended in the carrier gas, typically depending on the density and particle size of the powder. Therefore, feeders based on gas atomization are generally limited to relatively lower rates of powder feed. Further, the gas used to feed the powder may interfere with the melting of the powder by the flame. For example, the feed gas can mix with the combustion inputs, such as fuel and oxygen, and result in a significantly cooler flame temperature, which is undesirable. This can be especially problematic at higher feed rates.

Using brush feeders, powders tend to agglomerate into larger than desired sizes. Using screw, brush, and atomizer combinations, a screw inside a cylindrical feed shoot transports powder to the rotating brush. Powder is blown out the brush and entrained in gas flow. The disadvantage is that excess gas is needed to suspend the powder and is an undesired byproduct of the feed, and the extra gas can cool down the flame temperature.

Rotating drum feeders also have a problem with the tendency to have the powders agglomerate into larger than desired sizes, and powders often bridge on the rotating drum feeders.

There is a need in the art for a powder feeder that avoids bridging of nonflowing powders, clumping of powders being fed, is capable of breaking down large agglomerates, controls the size of the feed powder particles, while at the same time providing a uniform feed rate.

SUMMARY

One aspect of the present disclosure is directed to an apparatus comprising a hopper having a discharge opening, a screening member disposed proximate to the discharge opening, and a brush assembly within the hopper. The brush assembly includes a bristle element. The bristle element includes distal and proximal ends with the distal end located proximate to the screening member. A drive assembly rotates the brush assembly. When the hopper is filled with powder, the rotating brush assembly urges the powder out of the discharge opening.

Another aspect of the present disclosure is directed to an apparatus for making at least one of an amorphous or crystalline material. The apparatus includes a flame-melting device and a powder feeder assembly for feeding powder to the flame-melting device. The powder feeder assembly comprises a hopper having a discharge opening, a screening member disposed proximate to the discharge opening, and a brush assembly within the hopper. The brush assembly includes a bristle element having distal and proximal ends. The distal end is located near the screening member and can extend into or through the openings in the screening member. A drive assembly rotates the brush assembly whereby powder particles within the hopper are urged through a discharge opening in the screening member and are then delivered to the flame-melting device. An advantage of feeding powder to the flame-melting device using the powder feeder assembly of the present disclosure is that the powder delivered to the flame-melting device has reduction or elimination of bridging powder and agglomeration, thereby increasing the consistency and uniformity of the delivered powder.

Another aspect of the present disclosure is directed to a method of making at least one of an amorphous or crystalline material. The method includes feeding powder to a flame-melting device from a powder feeder. The powder feeder includes a hopper having a discharge opening. A screening member is disposed proximate to the discharge opening. A brush assembly is disposed within the hopper and the brush assembly includes a bristle element. The bristle element includes distal and proximal ends, with the distal end located proximate to the screening member. A drive assembly rotates the brush assembly to urge powder from the hopper into the flame-melting device. The powder is melted to provide a melt, and the melt is cooled to provide at least one of the amorphous or crystalline material. In some embodiments, the method further includes cooling the melt to provide at least some amorphous material. The amorphous material can also have a glass transition temperature, and the amorphous material can be heat-treated to form at least a portion thereof to a glass-ceramic material.

Another aspect of the present disclosure is directed to making fused polycrystalline material. The method includes feeding powder to a flame-melting device from a powder feeder assembly. The powder feeder comprises a hopper having a discharge opening, a screening member disposed proximate to the discharge opening, and a rotating brush assembly within the hopper. The brush assembly includes a bristle element, wherein the bristle element includes distal and proximal ends. The distal end is located proximate to the screening member. A drive assembly rotates the brush assembly, thereby urging powder from the hopper into the flame-melting device. The powder delivered to the flame-melting device is melted to form a melt. The melt is cooled to provide fused polycrystalline material. In some embodiments, the polycrystalline material is polycrystalline abrasive particles.

DEFINITIONS

In the context of this disclosure:

"Mesh Size," "mesh number," or "mesh" means the number of openings per linear inch, as defined by ASTM Standard E11-01. When a mesh number or mesh size is used without reference to particular units, the mesh size is the corresponding designation in E11-01.

DETAILED DESCRIPTION

Generally, the present disclosure is directed to an apparatus and method for feeding powder to a flame-melting device. Flame-melting assemblies are used for melting and/or fusing powders into other materials, such as crystalline and/or amorphous materials. Exemplary flame-melting assemblies include, flame forming, plasma spray and thermal spray assemblies. Powder is fed to the flame-melting assemblies using a powder feeder assembly of the present disclosure. The powder feeder assembly delivers powder to the flame-melting device.

Figure 1:
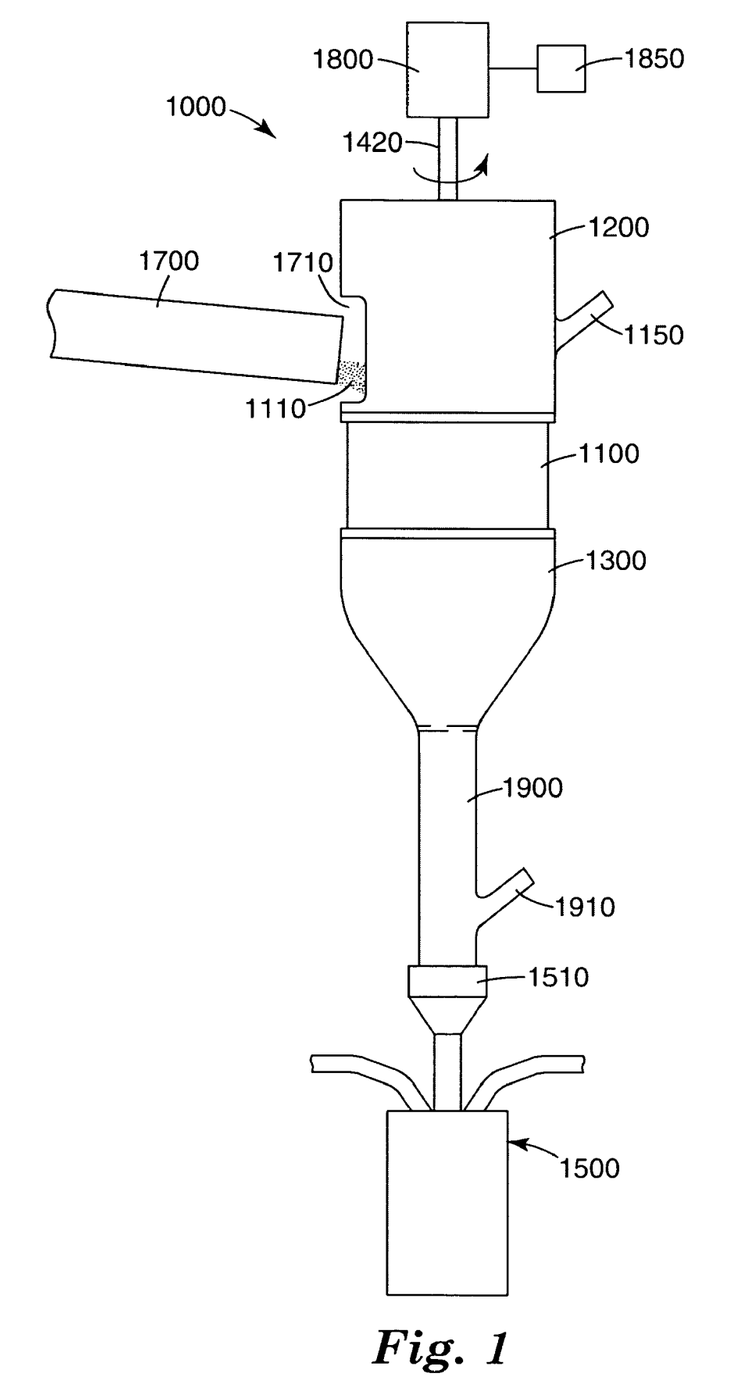
FIG. 1 is a side view of an exemplary embodiment of an apparatus including a powder feeder assembly for a flame-melting apparatus according to the present disclosure.
Figure 2:
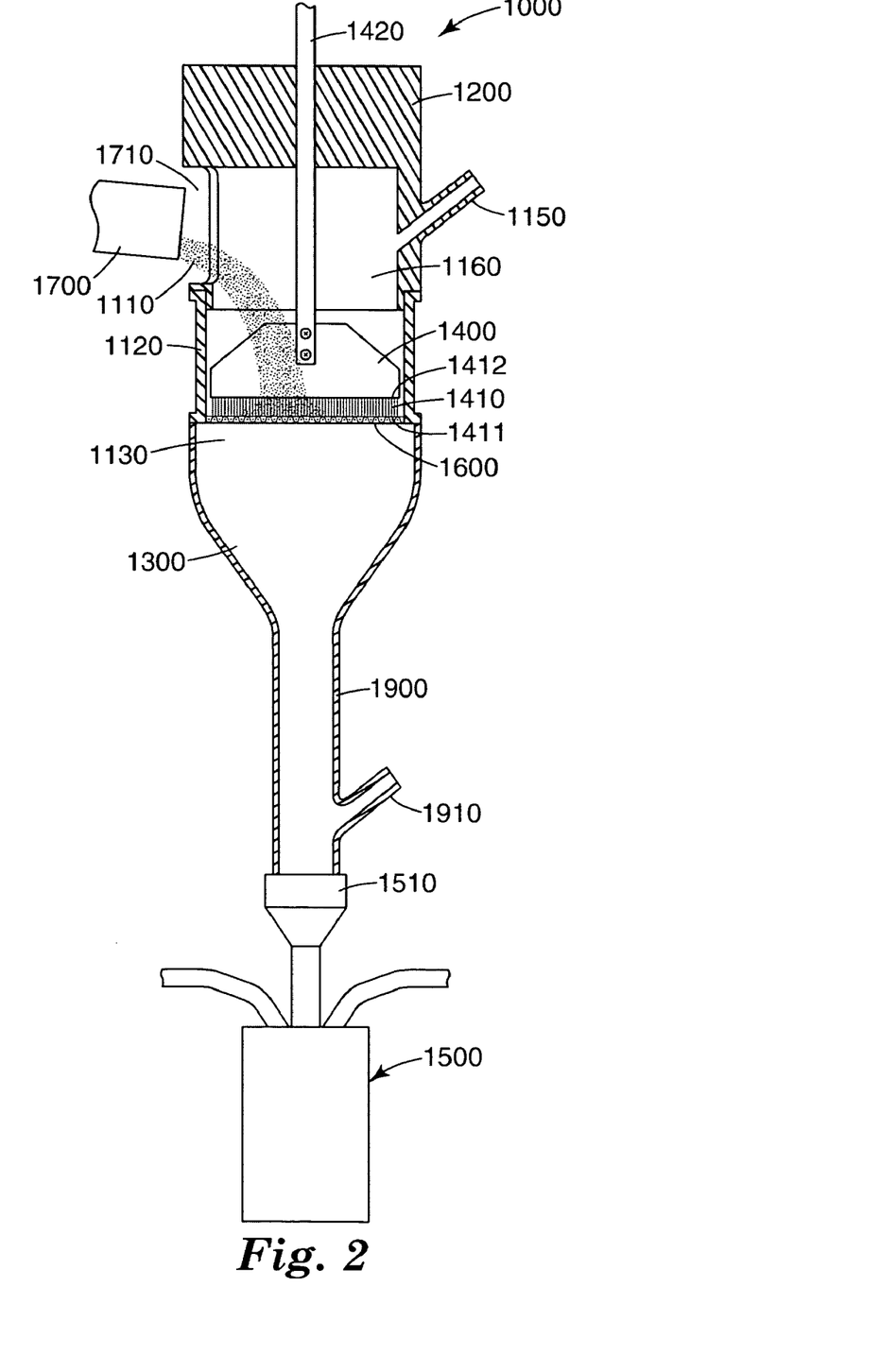
FIG. 2 is a section view of the apparatus of FIG. 1 according to the present disclosure.
Figure 3:
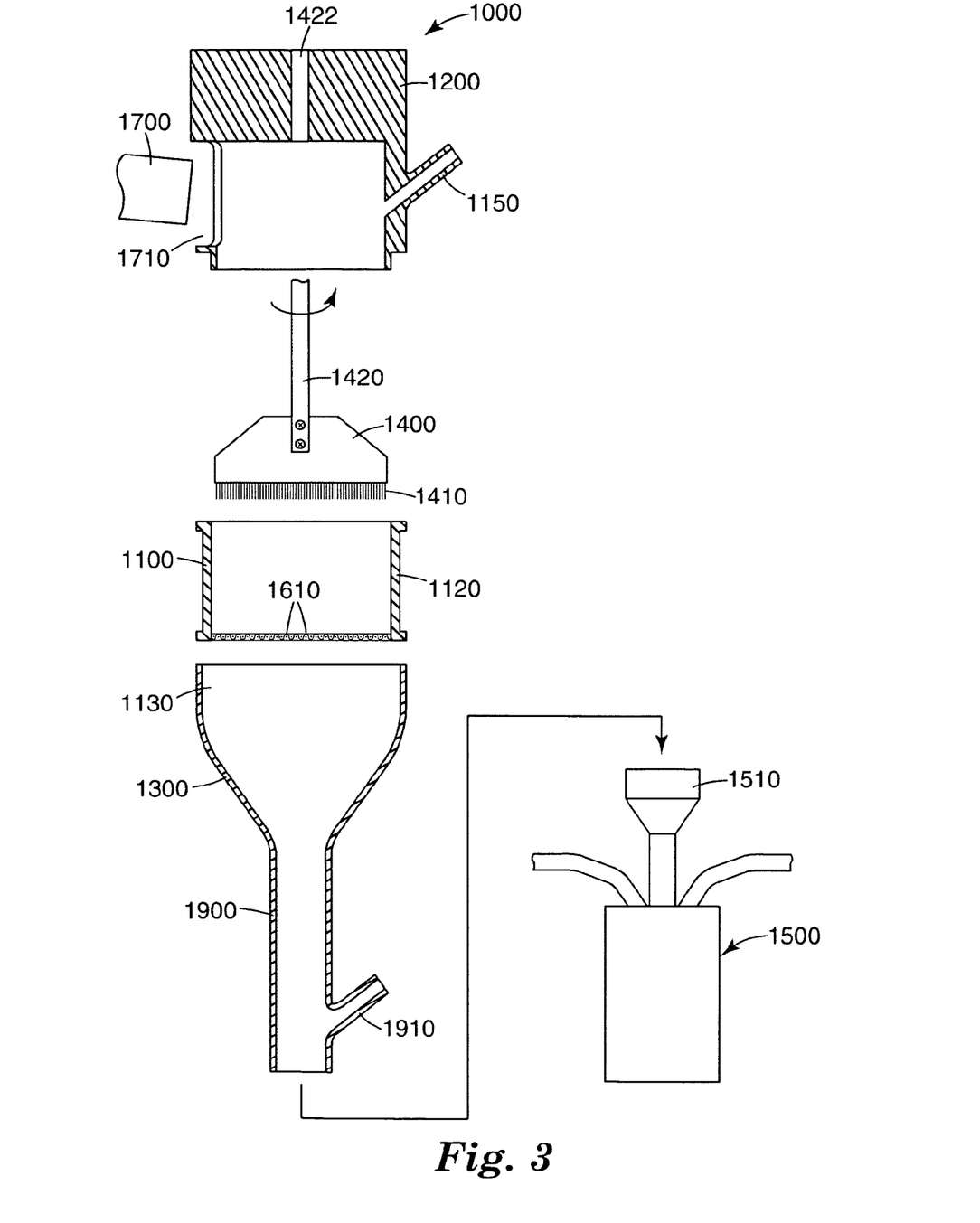
FIG. 3 is an exploded section view of the apparatus of FIG. 1 according to the present disclosure.

Referring to FIGS. 1-3, an exemplary embodiment of a system including a powder feeder assembly 1000 for feeding a flame-melting device 1500 is illustrated. The powder feeder assembly 1000 holds and delivers powder 1110 to the flame-melting device 1500. The flame-melting device 1500 includes a powder receiving section 1510 for receiving powder 1110 for melting and transforming into another material(s), such as crystalline or amorphous material and/or combinations thereof. Powder 1110 is delivered into the powder receiving section 1510 through a discharge opening 1130 of the powder feeder assembly 1000. Optionally, a connecting tube 1900 or other connecting means is positioned between the discharge opening 1130 and the powder receiving section 1510. Also, a funnel 1300 is positioned proximate to the discharge opening 1130 for receiving and directing powder 1110 flow after it leaves the discharge opening 1130. Both the connecting tube 1900 and funnel 1300 are optional, but they assist transporting powder 1110 from the discharge opening 1130 to the input section 1510 of the flame-melting device 1500. The connecting tube 1900 and funnel 1300 arrangement are well-suited for transporting powder 1110 when it is desirable for the discharge opening 1130 to be located a distance from the input section 1510. It is also helpful because typically to get a desired feed rate, the area of the discharge opening 1130 is greater than the area of the input section 1510. It is also useful when the shape of the discharge opening 1130 is different from the shape of the input section 1510.

Figure 8:
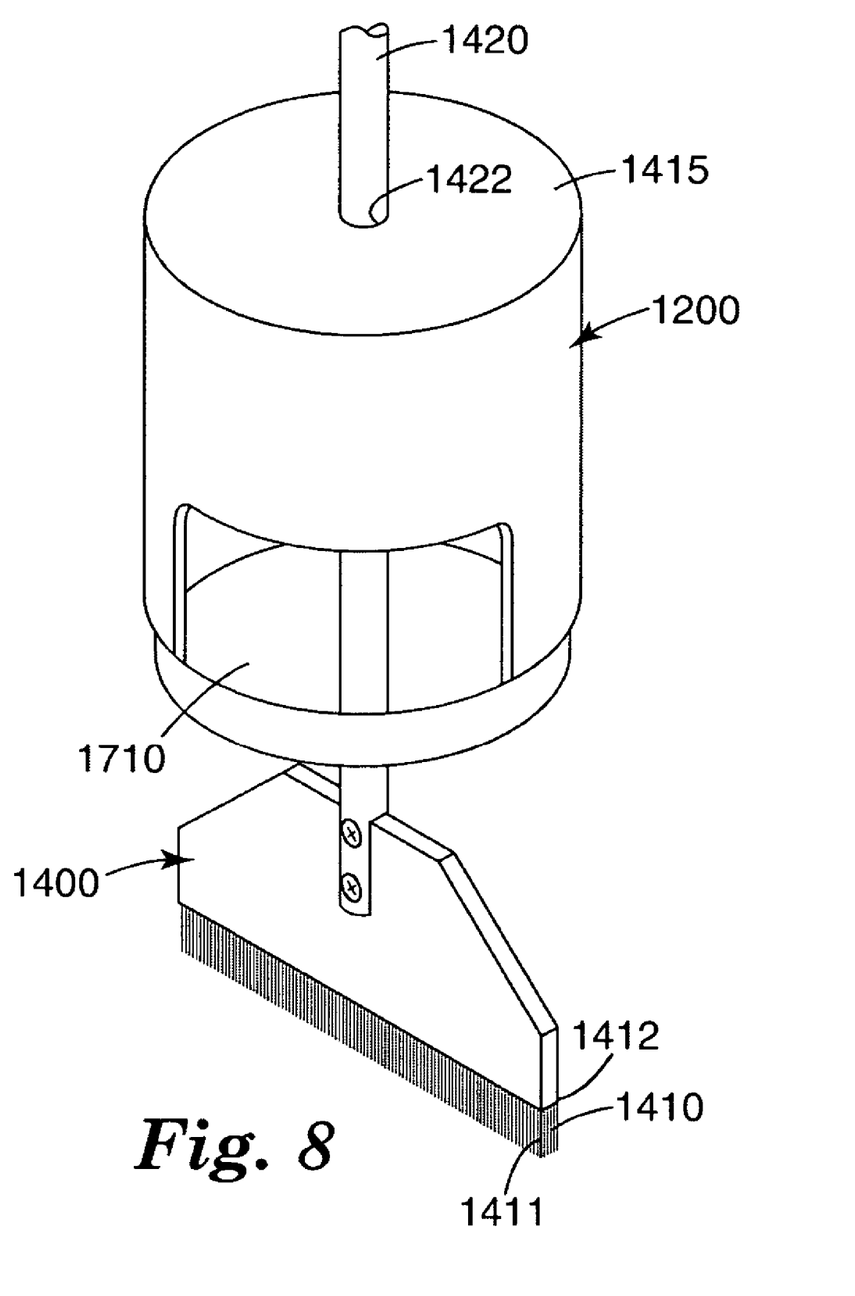
FIG. 8 is a perspective view of a portion of the powder feeder assembly of FIG. 1.

The powder feeder assembly 1000 includes a hopper 1100 for holding powder 1110. Typically, the hopper 1100 includes a body 1120 defined by a cylindrical wall, though other body shapes are possible. Also, the hopper 1100 can be made from a unitary piece or multiple pieces. The hopper 1100 in the example embodiment illustrated also includes a cover section 1200. The cover section 1200 includes an opening 1710 for feeding powder 1110 into the hopper 1100. Any commercially available delivery means can be used for filling the hopper 1100 with powder 1110, such as a screw feeder, vibratory feeder, or brush feeder. The cover section 1200 can also include a section 1415 having a shaft receiving opening 1422 (as illustrated in FIG. 8).

A brush assembly 1400 is disposed within the hopper 1100 body 1120. The brush assembly 1400 is connected to means for rotating the brush assembly 1400, such as a motor 1800. The motor 1800 can also be connected to means for adjusting the speed of the motor 1800, such as a motor speed controller 1850. Various drive assemblies can be used to drive the brush assembly, and any particular drive assembly does not limit the powder assembly. Depending on the particular conditions, the drive assembly can be, for example, a direct drive motor, a gear train, or a belt arrangement.

The brush assembly 1400 includes a bristle element 1410 having a distal end 1411 and a proximate end 1412. When powder 1110 is placed into the hopper 1100 for delivery to the flame-melting device 1500, the brush assembly 1400 is rotated within the hopper 1100. When the brush assembly 1400 is rotated, the bristle element(s) 1410 urges powder 1110 in the hopper 1100 through a screening member 1600. By adjusting the rotational speed of the brush assembly 1400, the feed rate of the powder 1110 through the screening member 1600 can be controlled. Also, the type of bristle element selected will vary depending on the particular application. Exemplary materials for the bristle elements are, for example, polymeric material such as nylon, natural materials such as horsehair, wood, or metals, such as brass or 304 stainless steel, or combinations thereof.

The size of the screening member 1600 is selected to control the size of the powder particles delivered to the flame-melting device 1500. The screening member 1600 typically is selected to have a uniform mesh size across the screening member 1600. The mesh size defines the arrangement of openings 1610 in the screening member 1600. Typically, the mesh size is in the range from mesh number 35 to 200, though other mesh sizes can be used, depending on the desired properties of the powder to be processed. Also, while mesh is typically defined in terms of openings having square cross-sections, other opening shapes can be used, for example, circular or diamond-shaped openings. Also, a screening member 1600 having multiple mesh sizes can be used.

The brush assembly 1400 cooperates with the screening member 1600 to deliver powder 1110 having desired properties from the discharge opening 1130 to the powder receiving section 1510 of the flame-melting device 1500. Distal end 1411 of bristle element 1410 is located in close proximity to the screening member 1600. While a small gap between distal end 1411 of bristle elements 1410 and screening member 1600 can be used, it is typical to keep the gap on the same order of magnitude as the particle size of the powder. However, one of ordinary skill in the art will appreciate that the gap can be much larger, depending on the particular properties of the powder being handled. Also, distal end 1411 of bristle element 1410 can be positioned flush with screening member 1600 or positioned to protrude into and extend through the mesh openings 1610 in the screening member 1600. For the bristle elements 1410 to protrude through the openings 1610, at least some of the bristle elements 1410 need to have a diameter smaller than the mesh size. Bristle elements 1410 can include a combination of bristles with different diameters and lengths, and any particular combination will depend on the operating conditions desired.

Extending the bristle element 1410 end 1411 into and through the openings 1610 allows the bristle elements 1410 to break up any particles forming bridges across openings 1610. Also the bristle elements 1410 will tend to break-up other types of blockages that can occur typical to powder feeding. The bristle element 1410 can be a unitary piece, or can also be formed from a plurality of bristle segments or stems. Also, if it is desired that the bristle elements 1410 extend into and/or through the mesh openings, then the bristle element 1410 size selected needs to be smaller than the smallest mesh opening 1610.

Referring to FIG. 3, in the exemplary embodiment illustrated, the hopper 1100 can include a wall defining a cylindrical body 1120. This shape conveniently provides for symmetry that allows for a more controlled flow rate of powder from the discharge opening 1130. Also, the cylindrical shape is well suited for using with a rotating brush assembly 1400, since the bristle element 1410 can extend to the wall, leaving little or no area on the screening member that can accumulate powder. However, other geometries are possible, as the particular conditions of use dictate.

The hopper 1100 also includes a cover section 1200. The cover section 1200 has an opening 1710 for receiving powder 1110 from a hopper feeder assembly 1700. The cover section 1200 cooperates with the body 1120 to form a powder chamber 1160. The opening 1710 on the cover 1200 can also be omitted or sealable so that a gas, such as nitrogen, argon, or helium can be input into a gas input line 1150 on the hopper 1100 for neutralizing the atmosphere or assisting in delivering the powder or particles to the flame-melting device. Also, gas can be used in the system for controlling the atmosphere surrounding the powder or particles. Also, a gas input line 1910 can be placed after the discharge opening 1130, for example, on the connecting tube 1900.

The entire powder feeder assembly 1000 can be vibrated to further assist in powder transport. Optionally, the screening member can be vibrated to assist powder transport through the powder feeder assembly. One of ordinary skill in the art will recognize that other possible vibrating means can be used, and there are abundant commercial vibrating systems and devices that are available depending on the particular conditions of use.

Figure 6:
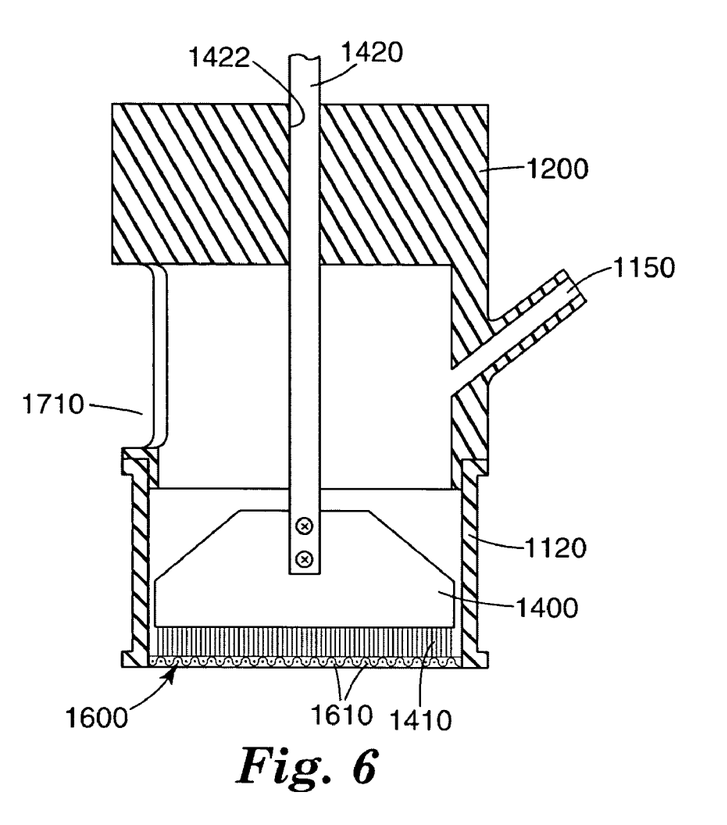
FIG. 6 is a section view of a portion of the powder feeder assembly of FIG. 1.
Figure 7:
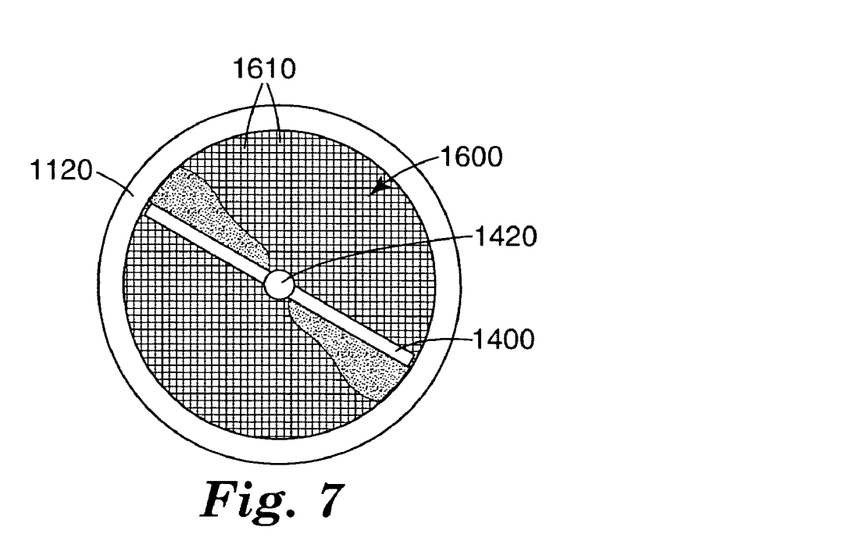
FIG. 7 is a plan view of a portion of the powder feeder assembly of FIG. 1.

Referring to FIGS. 1 and 6, when hopper 1100 includes a cover 1200 and a body 1120, the removable cover 1200 allows easy access to powder chamber 1160 for cleaning or changing the screening member 1600. Also, the brush assembly 1400 can be positioned to form the desired engagement between the bristle elements 1410 and the screening member 1600. When the brush assembly 1400 is attached to a rotating shaft 1420, the shaft 1420 can protrude outside opening 1422 in the cover 1200 to be driven, for example, by a motor 1800. The speed of the brush assembly 1400 can be controlled by means such as a speed controller 1850.

In another example embodiment, the powder feeder assembly 1000 can include multiple stages that can be used for grading particles, for example, in a stacked arrangement. Multiple brush assembly and screen members can be stacked within the hopper body. In such an arrangement, the coarsest grade would typically be the first stage and finer screen members would progressively include a higher mesh count. The finest grading is then fed into the powder receiving section 1510 of the flame-melting apparatus 1500.

Figures 4, 5:
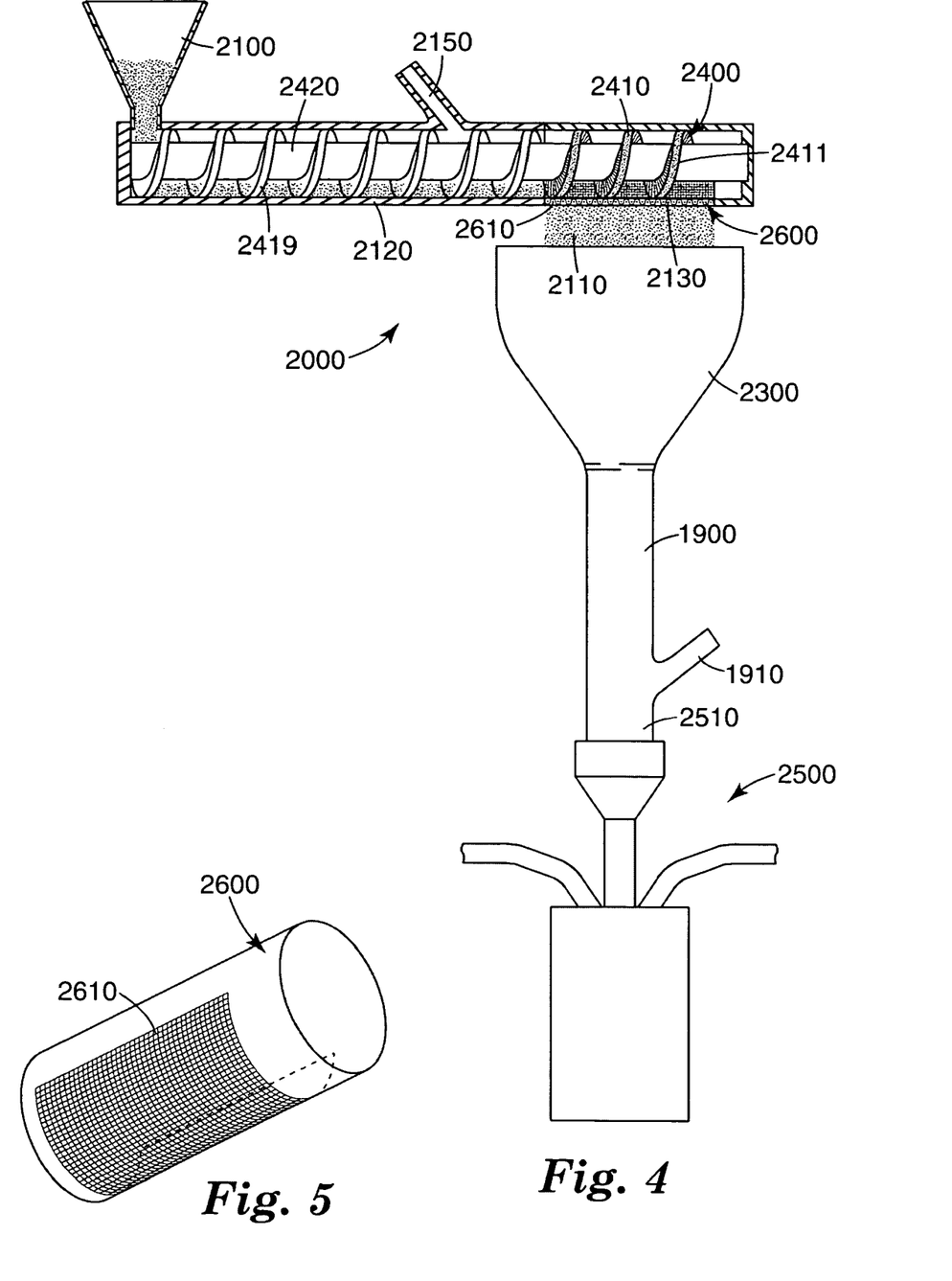
FIG. 4 is a side view of another exemplary embodiment of an apparatus including a powder feeder assembly for feeding powder to a flame-melting apparatus according to the present disclosure.
FIG. 5 is a perspective view of a screening member of the powder feeder assembly of FIG. 4 according to the present disclosure.

Referring now to FIGS. 4 and 5, another exemplary embodiment of a powder feeder assembly 2000 for delivering powder 2110 to a flame-melting device 2500 is illustrated. Powder feeder assembly 2000 delivers powder 2110 from a hopper 2100 to powder receiving section 2510 of the flame-melting device 2500. In the example embodiment illustrated, the hopper 2100 is coupled to a screw feeding section 2419. The screw feeding section 2419 includes brush assembly 2400 disposed proximate to an opening 2130 having a screening member 2600. The screw feeding section 2419 has a cylindrical section defining a body 2120.

The brush assembly 2400 is arranged on a shaft 2420 along a substantially helical path. Powder 2110 is urged from the hopper 2100 to the screening member 2600 (as illustrated at 2600 in FIG. 5). The screening member 2600 cooperates with the body 2120 of the screw feeding section 2419 to form an opening 2130 having a desired mesh size(s). The brush assembly 2400 urges powder 2110 along a path over and through the openings 2610 in the screening member 2600. As discussed above, the bristle element 2410 of the brush assembly 2400 can be positioned to form a small gap between the bristle ends 2411 and the screening member 2600. Alternatively, individual bristle elements 2410 can extend into or through the openings 2610. Also, a brush assembly 2400 having a bristle element 2410 arrangement having various bristle sizes and lengths can be used. With such an arrangement, some of the bristles can form a gap while others protrude into or through the openings. The screw feeder section 2419 can also include a gas input line 2150.

Powder 2110 exits the screening member 2600 via the discharge opening 2130 in the powder feeder assembly 2000. The powder 2110 can then be directly delivered to the flame-melting apparatus 2500 or can be channeled to the same using various arrangements, such as a funnel 2300 and connecting tube 1900 arrangement illustrated. The powder 2110 is then delivered to the powder receiving section 2510 of the flame-melting device 2500 for processing.

In another exemplary embodiment, the powder feeder assembly can include multiple stages that can be used for grading particles, for example, in a graduated mesh size arrangement on the screening member. In such an arrangement, the coarsest grade would typically be the first stage and finer screen members would progressively include a higher mesh count. The finest grading is then feed into the powder receiving section of the flame-melting apparatus.

Exemplary embodiments described herein allow continuous, stable feeding of fine powder (typically less than 500 micrometers, more typically less than 250 micrometers, even more typically less than 100 micrometers, and most typically less than 50 micrometers) or powder mixtures without bridging or significant agglomeration. Powders in this size range tend to bridge when fed with screw or vibratory feeders, and tend to agglomerate significantly, so that these feeding methods (vibratory, screw etc.) result in feeding "lumps." The rotating brush assembly with screening members as disclosed herein reduces or eliminates such bridging.

Continuous, stable feeding of fine powders, and in particular fine powders that have not been spray dried, is desirable in that flame-melting processes typically have higher yields and better products when the powder feed into the process is well dispersed. If the powder fed into the flame is not well dispersed (i.e., if there are lumps) the result can be a significant number of unreacted, incompletely reacted, or unmolten powder or particle contamination in the resulting product, as the lumps tend to have significantly poorer thermal transfer properties as compared to the powder itself. The desired product is powder with little or no contamination from unreacted particles. Similarly, if the feed rate is nonuniform, in some embodiments, there may be more particles in the flame than there is energy available to completely melt or react all particles; again the end result is nonuniform product. The systems described herein are well suited for feeding powder to flame-melting devices in a uniform manner with no appreciable lumping. Examples of flame-melting devices are those such as plasma spray, thermal spray, or flame forming devices.

Powders, for example, aluminum oxide, lanthanum oxides, or mixtures thereof, can be delivered to flame-melting devices. When the powders are affected by the flame-melting device, the powders are transformed into at least one of an amorphous and/or crystalline material. Further details of particular ingredients and products can vary. Examples of feed powders and products that can be made using the invention of the present disclosure can be found, for example, in co-pending patent applications having U.S. Ser. No. 10/740,262, filed Dec. 18, 2003; U.S. Ser. No. 10/739,420, filed Dec. 18, 2003; U.S. Publication No. 03-0081314-A1, published May 1, 2003; U.S. Ser. No. 10/740,096, filed Dec. 18, 2003; U.S. Ser. No. 10/739,441, filed Dec. 18, 2003; U.S. Ser. No. 10/739,624, filed Dec. 18, 2003; U.S. Ser. No. 10/739,439, filed Dec. 18, 2003, and exemplary operating parameters for making the same are also described therein.

Applicants have built and tested a system including a powder feeding assembly for feeding a flame-melting device. The flame-melting device included a powder input section for receiving powder delivered vertically to the input section. The flame-melting device used was a Bethlehem Bench Burner PM2D Model B with a central feed port and water-cooling, available from Bethlehem Apparatus Co., Hellertown, Pa. The powder feeding assembly used to deliver powder to the flame-melting device included a powder chamber having a 3-inch (8 centimeter) diameter cross-section. A brush assembly was positioned inside the powder chamber. A screening member was also positioned at the lower end of the chamber next to the brush assembly. Bristles from the brush assembly were positioned so that the bristle ends extended into the openings on the screening member. The screening members were stainless steel USA Standard Testing Sieve (ASTME 11 Specification), available from W.S. Tyler Inc., Mentor, Ohio. Various mesh sizes were used, as will be discussed hereinafter. Other materials can be used for the screening member, for example, brass.

The brush assembly used was a Nylon Strip Brush (1 inch (2.5 cm) overall height, 5/16 inch (0.8 cm) bristle length and 0.020 inch (5 millimeter) diameter), part # 74715T61, available from McMaster-Carr, Chicago, Ill. The brush assembly was coupled to a shaft, which in turn was coupled to and driven by a DC Gear Motor (130 Volt, Ratio 60:1, Torque 22 Lb-in), available from Bodine Electric Company, Chicago, Ill. The speed of the motor was controlled using a Type-FPM Adjustable Speed PM Motor Control, Model # 818, also available from Bodine.

Table 1 summarizes the operating parameters that Applicants achieved using the powder feeding assembly.

TABLE 1

| Powder | Rotational Speed (revolutions per minute) | Screen, 3-inch (8 cm) diameter (mesh size) | Feed Rate (grams per minute) |
| --- | --- | --- | --- |
| Lanthanum Oxide | 6 | 30 | 18.6 |
| Lanthanum Oxide | 16 | 30 | 40.4 |
| Aluminum Oxide | 36 | 100 | 4 |

The aluminum oxide used was obtained from Alcoa Industrial Chemicals, Bauxite, Ark., under the trade designation A16SG. The lanthanum oxide used was obtained from Molycorp Inc., Mountain Pass, Calif. The powder feeder assembly delivered the above-referenced feed rates of material without any discernible bridging or clumping of the powder.

The powder feeder assembly of the present disclosure can be used for making various materials in conjunction with flame-melting processes. For example, the powder feeder assembly can be used to make amorphous material, fused polycrystalline material, or fused polycrystalline particles, and/or combinations thereof.

In one embodiment, a method of making amorphous material is disclosed. The method includes feeding powder to a flame-melting device from a powder feeder assembly. The powder feeder assembly includes a hopper having a discharge opening, a screening member disposed proximate to the discharge opening, and a rotating brush assembly within the hopper. The brush assembly includes one or more bristle elements having distal and proximal ends. The distal ends are located proximate to the screening member and can form a gap or protrude into or through the screening member, or combinations thereof. A drive assembly rotates the brush assembly, thereby urging powder through a discharge opening and into a powder receiving section of the flame-melting device. The flame-melting device melts the powder to provide a melt. The melt is cooled to directly provide amorphous material. In some embodiments, the material has a glass transition temperature, $T_g$. The melt can also be cooled to form completely or partially an amorphous material. Additionally, the method can also include heat-treating the amorphous material to convert at least a portion of the material to a glass-ceramic.

In another embodiment, a method of making fused polycrystalline material is disclosed. The method includes feeding powder to a flame feeder from a powder feeder. The powder feeder includes a hopper having a discharge opening, a screening member disposed proximate to the discharge opening, and a rotating brush assembly within the hopper. The brush assembly includes one or more bristle elements having distal and proximal ends. The distal ends are located proximate to the screening member and can form a gap or protrude into or through the screening member, or combinations thereof. A drive assembly rotates the brush assembly, thereby urging powder through a discharge opening and into a powder receiving section of the flame-melting device. The flame-melting device melts the powder to provide a melt. The melt is cooled to directly provide fused polycrystalline material.

In another embodiment, a method of making fused polycrystalline particles (e.g. abrasive particles) is disclosed. The method includes feeding powder to a flame feeder from a powder feeder. The powder feeder includes a hopper having a discharge opening, a screening member disposed proximate to the discharge opening, and a rotating brush assembly within the hopper. The brush assembly includes one or more bristle elements having distal and proximal ends. The distal ends are located proximate to the screening member and can form a gap or protrude into or through the screening member, or combinations thereof. A drive assembly rotates the brush assembly, thereby urging powder through a discharge opening and into a powder receiving section of the flame-melting device. The flame-melting device melts the powder to provide a melt. The melt is cooled to directly provide fused polycrystalline abrasive particles.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. An apparatus comprising:
a hopper having a discharge opening;
a screening member disposed proximate the discharge opening;
a brush assembly within the hopper, the brush assembly including a bristle element, wherein the bristle element includes distal and proximal ends, the distal end located proximate to the screening member; and
a drive assembly for rotating the brush assembly, further including a cascading arrangement of screening members, each screening member having a cooperating brush assembly.

2. The apparatus of claim 1, further including a feeder assembly for feeding material into the hopper.

3. The apparatus of claim 2, wherein the feeder assembly is a continuous feeder assembly.

4. The apparatus of claim 1, further including means for adjusting the rotational speed of the brush assembly.

5. The apparatus of claim 1, wherein the hopper includes a gas input opening.

6. The apparatus of claim 1, further including a funnel section coupled to the discharge opening of the hopper.

7. The apparatus of claim 6, wherein the funnel section is detachable from the hopper.

8. An apparatus for making at least one of an amorphous or crystalline material comprising:
a flame forming device;
a powder feeder assembly for feeding powder to the flame forming device, the powder feeder assembly comprising:
a hopper having a discharge opening and a feeder opening, wherein the feeder opening is adapted to receive material when the flame-forming device is operating;
a screening member disposed proximate to the discharge opening;
a rotating brush assembly within the hopper, the brush assembly including a bristle element, wherein the bristle element includes distal and proximal ends, the distal end located proximate to the screening member; and
a drive assembly for rotating the brush assembly.

9. The apparatus of claim 8, further including a tube connecting the powder feeder to the flame forming device, wherein powder from the discharge opening is introduced into the flame forming device.

10. The apparatus of claim 8, wherein the bristle element includes a plurality of bristle stems.

11. The apparatus of claim 9, wherein the plurality of bristle stems are made from a polymeric material.

12. The apparatus of claim 10, wherein the plurality of bristle stems is in a range from 3 millimeters to 50 millimeters in length.

13. The apparatus of claim 8, wherein the screening assembly has a constant mesh size.

14. The apparatus of claim 13, wherein the mesh size is in a range from 30 and 200.

15. The apparatus of claim 8, wherein the hopper includes a body defined by a cylinder and wherein the screening member is oriented perpendicularly within the body.

16. The apparatus of claim 8, further including a cascading arrangement of screening members, each screening member having a cooperating brush assembly.

17. The apparatus of claim 8, further including a feeder assembly for feeding material into the feeder opening of the hopper.

18. The apparatus of claim 17, wherein the feeder assembly is a continuous feeder assembly.

19. The apparatus of claim 8, further including means for adjusting the rotational speed of the brush assembly.

20. The apparatus of claim 8, wherein the hopper includes a gas input opening.

21. The apparatus of claim 8, further including a funnel section coupled to the discharge opening of the hopper.

22. The apparatus of claim 21, wherein the funnel section is detachable from the hopper.

* * * * *

UNITED STATES PATENT AND TRADEMARK OFFICE
CERTIFICATE OF CORRECTION

PATENT NO.       : 7,232,543 B2
APPLICATION NO.  : 10/739233
DATED            : June 19, 2007
INVENTOR(S)      : Ahmet Celikkaya et al.

It is certified that error appears in the above-identified patent and that said Letters Patent is hereby corrected as shown below:

On Title Page item 54
Line 1, delete the word "POWER" and insert in place thereof -- POWDER --.

Column 1
Line 1, delete the word "POWER" and insert in place thereof -- POWDER --.

Column 3
Line 36, delete the word "DRAWING" and insert in place thereof -- DRAWINGS --.

Signed and Sealed this

Second Day of October, 2007

JON W. DUDAS
*Director of the United States Patent and Trademark Office*